(12) United States Patent
Menahem et al.

(10) Patent No.: US 9,823,995 B2
(45) Date of Patent: Nov. 21, 2017

(54) STRUCTURED QUERY LANGUAGE DEBUGGER

(71) Applicants: Tamir Menahem, Ramat Gan (IL);
Ohad Navon, Kiryat Tivon (IL);
Amiram Wingarten, Rehovot (IL);
Inbal Zilberman Kubovsky, Ramat Gan (IL)

(72) Inventors: Tamir Menahem, Ramat Gan (IL);
Ohad Navon, Kiryat Tivon (IL);
Amiram Wingarten, Rehovot (IL);
Inbal Zilberman Kubovsky, Ramat Gan (IL)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 14/471,453

(22) Filed: Aug. 28, 2014

(65) Prior Publication Data

US 2016/0062870 A1    Mar. 3, 2016

(51) Int. Cl.
G06F 9/45        (2006.01)
G06F 11/36       (2006.01)

(52) U.S. Cl.
CPC ........ *G06F 11/362* (2013.01); *G06F 11/3636* (2013.01); *G06F 11/3664* (2013.01)

(58) Field of Classification Search
None
See application file for complete search history.

(56) References Cited

U.S. PATENT DOCUMENTS

| 7,663,616 B2 | 2/2010 | Choi et al. |
| 8,190,660 B2 | 5/2012 | Harel et al. |
| 2003/0056198 A1* | 3/2003 | Al-Azzawe ............. H04L 67/14 717/127 |
| 2003/0066053 A1 | 4/2003 | Al-Azzawe |

(Continued)

OTHER PUBLICATIONS

Communication and extended European Search Report dated Jan. 12, 2016 for related EP Application No. 15002056.8-1951; 9 pages.

(Continued)

*Primary Examiner* — Li B Zhen
*Assistant Examiner* — Lenin Paulino
(74) *Attorney, Agent, or Firm* — Fish & Richardson P.C.

(57) ABSTRACT

The present disclosure describes methods, systems, and computer program products for debugging structured query language (SQL) statements. One computer-implemented method includes receiving a request to fetch a debug execution plan considering different structured query language (SQL) execution optimization levels and including a mapping for a SQL statement, receiving a request to initialize a debugging process of the SQL statement, verifying received and attached filter criteria provided using a SQL debug channel, setting SQL statement breakpoints, triggering the SQL statement, transmitting a notification that a SQL process is attached to a debugger associated and ready for external execution control, providing state details and an intermediate result upon reaching a particular breakpoint associated with the SQL process, providing an ability to change the process state and influence the process, and providing a SQL final execution response after reaching the end of the execution of the triggered SQL statement.

20 Claims, 8 Drawing Sheets

(56) References Cited

U.S. PATENT DOCUMENTS

| | | | | |
|---|---|---|---|---|
| 2003/0233632 A1* | 12/2003 | Aigen | ............ | G06F 8/30 |
| | | | | 717/106 |
| 2005/0193264 A1* | 9/2005 | Khan | ............ | G06F 11/362 |
| | | | | 714/38.14 |
| 2006/0218125 A1* | 9/2006 | Kandil | ............ | G06F 11/362 |
| 2009/0307652 A1* | 12/2009 | Maybee | ............ | G06F 11/3644 |
| | | | | 717/104 |
| 2010/0030758 A1* | 2/2010 | Belknap | ............ | G06F 17/30463 |
| | | | | 707/718 |
| 2010/0161101 A1* | 6/2010 | Pouyez | ............ | G06Q 10/10 |
| | | | | 700/108 |
| 2012/0117041 A1* | 5/2012 | Rodriguez | ............ | G06F 11/3664 |
| | | | | 707/702 |
| 2013/0018966 A1 | 1/2013 | Kubovsky et al. | | |
| 2013/0191815 A1* | 7/2013 | Davis | ............ | G06F 9/45508 |
| | | | | 717/129 |
| 2014/0344625 A1* | 11/2014 | Thatte | ............ | G06F 17/30 |
| | | | | 714/38.1 |

OTHER PUBLICATIONS

Torsten Grust et al: "Observing SQL queries in their natural habitat", ACM Transactions on Database Systems, ACM, New York, NY, US, vol. 38, No. 1, Apr. 26, 2013, pp. 1-33, XP058014903.

* cited by examiner

STRUCTURED QUERY LANGUAGE DEBUGGER

BACKGROUND

The structured query language (SQL) can be in the form of standalone (individual) SQL statements, part of database procedure (e.g., stored procedure), or embedded (i.e., contained), dynamic or static, in any high-level programming language (for example: C/C++, JAVA, COBOL, and ABAP). These SQL statements, standalone, part of database procedure, or embedded, can be very complex and may contain, for example, hundreds of lines of code including complex joins of multiple database tables/views, multiple sub (nested)-queries, and/or filters. Without the ability to debug such SQL statements it is very hard to develop and maintain them and the result is a poor user experience, and/or introduces errors that can result in a higher total cost of ownership for users. Database procedure debuggers typically support debugging (e.g., detection and correction) of a database procedure's logic portion but treats the SQL statement (natural dominant database procedure part) as an atomic step (e.g., a black box) without a step-in capability—i.e., where a user can view a final result of the SQL statement but without understanding a result of each an ordered set of sub-steps (intermediate results) associated with the SQL statement which are used to access or modify information. As a database procedure body can include very complex SQL statements, a typical database procedure debugger can be useless as the logic surrounding the included SQL statements might be relatively simple compared to the SQL statements themselves or even possess no logic at all. Without the ability to debug the included SQL statements, also database procedures can be difficult to debug. This SQL debug becomes an even more critical problem today due to the growing trend of massive database usage in business applications.

SUMMARY

The present disclosure relates to computer-implemented methods, computer-readable media, and computer systems for debugging structure query language (SQL) statements. One computer-implemented method includes receiving a request to fetch a debug execution plan considering different structured query language (SQL) execution optimization levels and including a mapping for a SQL statement, receiving a request to initialize a debugging process of the SQL statement, verifying received and attached filter criteria provided using a SQL debug channel, setting SQL statement breakpoints, triggering the SQL statement, transmitting a notification that a SQL process is attached to a debugger associated and ready for external execution control, providing state details and an intermediate result upon reaching a particular breakpoint associated with the SQL process, providing an ability to change the process state and influence the process, and providing a SQL final execution response after reaching the end of the execution of the triggered SQL statement.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, comprising loading a SQL debug view of the selected SQL statement based on the debug execution plan.

A second aspect, combinable with any of the previous aspects, wherein the debugging process is associated with a plurality of contexts.

A third aspect, combinable with any of the previous aspects, comprising viewing intermediate results, and evaluating expressions associated with the SQL process based on the intermediate results, a context of the plurality of contexts, data tables in a data store, and a context change which influences the rest of debugged process execution.

A fourth aspect, combinable with any of the previous aspects, wherein newly attached filter criteria overrides previous filter criteria as long as the debugging process is active.

A fifth aspect, combinable with any of the previous aspects, comprising initializing a query engine to execute the SQL statement using the debug execution plan and filter criteria.

A sixth aspect, combinable with any of the previous aspects, comprising providing a break notification when a particular breakpoint associated with the SQL statement is reached.

The subject matter described in this specification can be implemented in particular implementations so as to realize one or more of the following advantages. First, the SQL debugger allows step-in functionality to building blocks of a SQL statement. This allows a user to control the processing of the SQL statement in a step-by-step mode, modification of values, etc. during execution. Second, a SQL debugger can provide detailed information regarding each step for a current context of a SQL statement execution, for example, variable values, select item values, a query result evolving at each step, a result of expressions within a query, etc. For example, in a case where a SQL statement result is not as a user expects (e.g., an incorrect JOIN or other condition, mistyped expression, etc.) the user could see where the error is occurring with SQL debugging capabilities and can focus on that area of code to correct the problem. The visualization of intermediate operations during a SQL statement's execution could be textual and (side-by-side)/or graphical depending on user preferences. In some instances, the provided SQL debugging capability could also assist with standalone SQL statements used by database administrators (i.e., not part of a database procedure). Standalone SQL statements are typically built for a temporary (ad hoc) reason (e.g., query an amount of users which had the highest operation activity during the last few hours, etc.). Third, the SQL debugger can be used to debug a SQL statement regardless of the origin source (e.g., for embedded SQL). Fourth, the SQL debugger can be used to debug a SQL statement, even taking into account varies SQL optimizations levels performed by a query engine. Fifth, while the SQL debugger's main goal is a logic aspect (i.e., prove logic corrections), the provided process transparency increases user capability in improving database models and performance. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
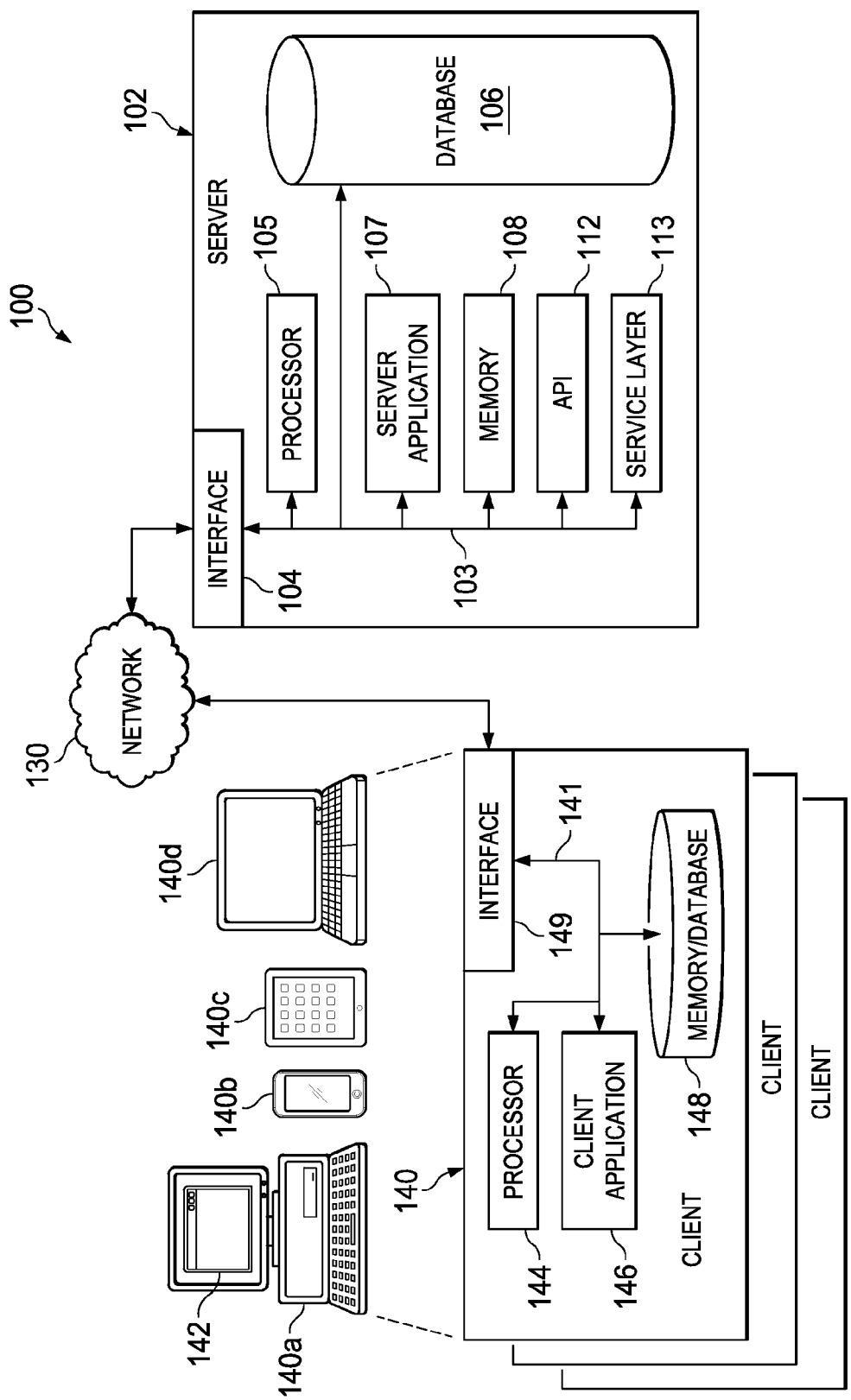
FIG. 1 is a block diagram illustrating an example distributed computing system (EDCS) for debugging structured query language (SQL) statements according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Structured query language (SQL) can be in the form of standalone (individual) SQL statements, part of database procedure (e.g., stored procedure), or embedded (i.e. contained), dynamic or static, in any high-level programming language (for example: C/C++, JAVA, COBOL, and ABAP). These SQL statements, standalone, part of database procedure, or embedded, can be very complex and may contain, for example, hundreds of lines of code including complex joins of multiple database tables, multiple sub (nested)-queries, and/or filters. Without the ability to debug such SQL statements it is very hard to develop and maintain them and the result is a poor user experience, and/or introduces errors that can result in a higher total cost of ownership for users.

Database procedure (e.g., stored procedure) debuggers typically support debugging (e.g., detection and correction) of a database procedure's logic portion but treats a SQL statement (natural dominant database procedure part) as an atomic step (e.g., a black box) without a step-in capability—i.e., where a user can view a final result of the SQL statement but without understanding a result of each an ordered set of sub-steps (intermediate results) associated with the SQL statement which are used to access or modify information. As a database procedure body can include very complex SQL statements, a typical database procedure debugger can be relatively useless as the logic surrounding the included SQL statements might be relatively simple compared to the SQL statements themselves or even possess no logic at all. For example:

```
CREATE PROCEDURE MY PROCEDURE
(IN cnt INT)
    IF cnt=1 THEN
        Complex SQL 1 Statement
    ELSEIF cnt=2 THEN
        Complex SQL 2 Statement
    ELSE
        Complex SQL 3 Statement
    ENDIF
END
```

Without the ability to debug an included SQL statement (e.g., a "Complex SQL <X> Statement"), database procedures can be difficult to debug, result in a poor user experience, and/or introduce errors that can result in a higher total cost-of-ownership (TCO) for users. In the example above, a stored procedure debugger is very limited without the ability to debug the SQL as only the complex SQL statement results can be analyzed and not, for example, how the results were generated.

A user can be considered anyone who tests, analyzes, inspects, and/or develops SQL as part of application or standalone SQL, for example a software developer, database administrator (DBA), business intelligence (BI) expert, quality assurance (QA) expert, etc.

SQL is an established special-purpose programming language for structuring queries for managing data in relational databases (DBMS). SQL commands/statements for inserting, updating and querying data (a.k.a., Data Manipulation Language (DML) commands) can be very complex, and can be difficult to write and prove as correct. Note that other SQL statements, such as DDL (Data Definition Language), DCL (Data Control Language) and TCL (Transaction Control) statements usually are not changed frequently and do not contain complex logic. However, in some implementations, the described concepts can also be applied to DDL, DCL, and/or TCL.

Figure 2A:
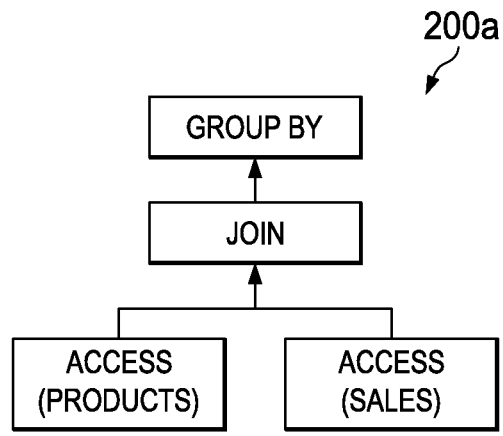
FIGS. 2A and 2B represent simple example SQL execution plans according to an implementation.
Figure 2B:
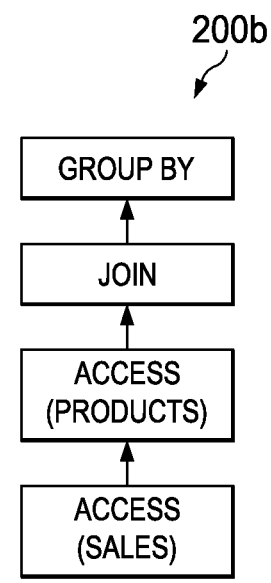

SQL statements compiled into a single execution plan (see FIGS. 2A and 2B). In some implementations, a database stored procedure can contain proprietary extensions to SQL which is usually included as a dominant embedded part of the stored procedure.

Programming environments for traditional languages like C++, PYTHON, and/or JAVA offer debugging tools (debuggers), which are used by developers (e.g., users) to inspect their programs, find errors, and/or prove correct execution. Without SQL debugger users are forced today to use primitive methods to debug SQL statements. Due to the growing trend of massive database usage in business applications, the unavailability of SQL debugging tools is a critical problem.

A SQL debugger is a user tool that supports SQL debugging. A SQL debugger typically consists of two parts, a client-side SQL debugger and a server-side SQL debugger.

Without SQL debugger functionality, users typically engage in time consuming and tedious workarounds in order to detect errors and to correct SQL statements. Common approaches are:

Execution plans (textual or graphical view) investigations.

Breaking a SQL statement into sub-SQL statements (including omission of specific parts, such as groupings, order fields, and filters) and executing each sub-SQL statements separately.

What are needed are computer-implemented methods, computer-program products, and systems for debugging SQL statements. Described is a novel SQL debugger that allows users to inspect and debug SQL statements in an efficient way that is similar to the state-of-the-art debugging process of applications written in traditional programming languages.

Conventional programming languages describe programs as a sequence of imperative statements; correspondingly, debuggers support the setting of breakpoints between such statements, which allow the examination of the state of the program at those logical points. A breakpoint is a point in a program that, when reached, triggers debug process behavior, such as program execution pause (suspend).

SQL, however, is a declarative language with statements that can contain arbitrarily complex embedded logic, especially in case of analytic usage. Unlike conventional programming languages, there is no identifiable sequence of individual operations and, therefore, a special solution is required.

The SQL debugger provides capabilities to execute a SQL statement step-by-step (analogous to the line-by-line execution of conventional programming languages) and to examine (and/or evaluate/modify) the intermediate results (e.g., intermediate tables and records) at each step (analogous to the values of variables of conventional programming languages). The SQL breakpoints may set on the SQL statement itself and/or on a related execution plan. A modified value of an intermediate result can be used continue a process using the new (modified) value. This is achieved by allowing a user to modify a value on a client which then triggers a change of a value in the database query engine.

SQL debugger helps users to determine why SQL isn't executing as expected and can simulate new situations by modifying the intermediate results. During debugging, a user should be able to evaluate expressions based on intermediate results, context, on stored tables, etc. An expression can, in some implementations, be a simple expression or a free query and a developer should be able to set a conditional breakpoint with a free-form expression or a query as a condition In some implementations, a database query engine exposes application programming interfaces (APIs) for debugging purposes, e.g., allowing for SQL statements, among other things, execution suspension, a capability to retrieve and manipulate intermediate results, and execution resumption. A SQL debugger can be independent and/or integrated with a database procedure debugger (or any high-level programming language debugger), so a user can start SQL statement execution directly (or from another application or from another debugger, such as a database procedure debugger) and then enter into the SQL statement to access and work with inner SQL statements for debugging (e.g., similar to entering into a nested method of traditional programming languages as described above). For example, a user can step into a SQL statement part or set breakpoints based on an execution plan and break (pause) accordingly.

In some implementations, a mapper maps between database query engine steps to an original SQL statement executed by a user. Accordingly, the user gets results which can be directly matched to the original SQL statement portion.

Debugging allows a developer to detect errors in and correct a SQL statement's logic and it is typically not meant for performance optimization (at least not for deep optimization tuning). Accordingly, an execution plan during SQL statement debugging can be planned/performed without using optimization (e.g., a SQL statement performed in sequential steps instead of typical parallel steps). Typically, non-optimization is the default debug mode as it provides debugging capability purpose balanced with usability. If a user decides to use an optimized mode or needs to actually debug optimizations, then parallel debugging (same as multi-threaded debugging) can be performed as long as the user is aware that multi-threaded debugging might result in some skipped actions, etc. (e.g., no break although breakpoints set, etc.). The optimization level is not a dichotomy option but rather ranges and subsets which fit to developers requirements (e.g., experience and actual debug purposes).

SQL can be part of a stored procedure, and/or embedded in any high-level programming language. In a multi-language development scenario, a unified debugger must be able to support debugging across language boundaries; including embedded SQL statements. The unified debugger (a.k.a., an integrated debugger, cross-language debugger, etc.) is a user tool that supports debugging for multiple programming languages similar to a multiple nested call stack debug of single programming language in a standard debugger.

A typical SQL scenario may include integration of stored procedure debugger and SQL debugger, or any high-level programming language debugger with SQL debugger.

A single SQL statement can consist of hundreds of lines, including complex joins of multiple tables, multiple sub (nested) queries, and filters. Accordingly, it may considered as a conventional program. For example:

```
SELECT ...
FROM
    (
        SELECT ...
            CASE
                WHEN ... THEN ...
                WHEN ... THEN ...
                ELSE ...
            CASE
                WHEN ... THEN ...
                WHEN ... THEN ...
                ELSE ...
        FROM ...
        WHERE ...
            (
                SELECT ...
                FROM ...
                WHERE ...
            )
                LEFT JOIN ... ON ... AND ...
    )
    GROUP BY ...
    HAVING ...
    ORDER BY ...
```

The execution order of an SQL statement is determined by the DBMS, and consists of a SQL execution plan. The SQL execution plan is logically in the form of a dependency graph (e.g., a directed acyclic graph), consisting of nodes and directed edges that connect the nodes. A node is also known as an execution plan operator, takes one or more inputs, and computes one or more outputs. The execution plan operator is an atomic debuggable part, similar to a statement in a conventional programming language. There is a directed edge between two nodes, if one node produces an output that is the input of a depending node.

Consider the following single SQL statement:

```
SELECT prod_name, avg(price)
FROM sales, products
WHERE products.prod_id = sales.prod_id
GROUP BY prod_name;
```

Example execution plans corresponding to this SQL statement are presented in FIGS. 2A and 2B. FIGS. 2A and 2B represent simple example SQL execution plans 200a and 200b according to an implementation. Plan Operators (i.e., operators involved in the SQL Execution Plan-Access, Join, Group By, etc.) are treated as atomic operations by the invented SQL debugger; it is possible to set a breakpoint before or after the execution of each plan operator. A breakpoint is a point in a program that, when reached, triggers debug process behavior, such as program execution pause (suspend). SQL breakpoints may set on the SQL statement itself and/or on related execution plan. Note that the execution plan of FIG. 2B can be a non-optimized form of the execution plan of FIG. 2A (e.g., Access products and Access sales performed in parallel while in FIG. 2B, these operations are performed consecutively), or can be in a range of optimization, i.e., semi-optimized or a specific optimization level. In this case where there are different execution plans for a debug mode (for example without optimization), execution plans can be differentiated between a productive execution plan (optimized) and debug execution plan/s (non-optimized plan/s).

Figure 2C:
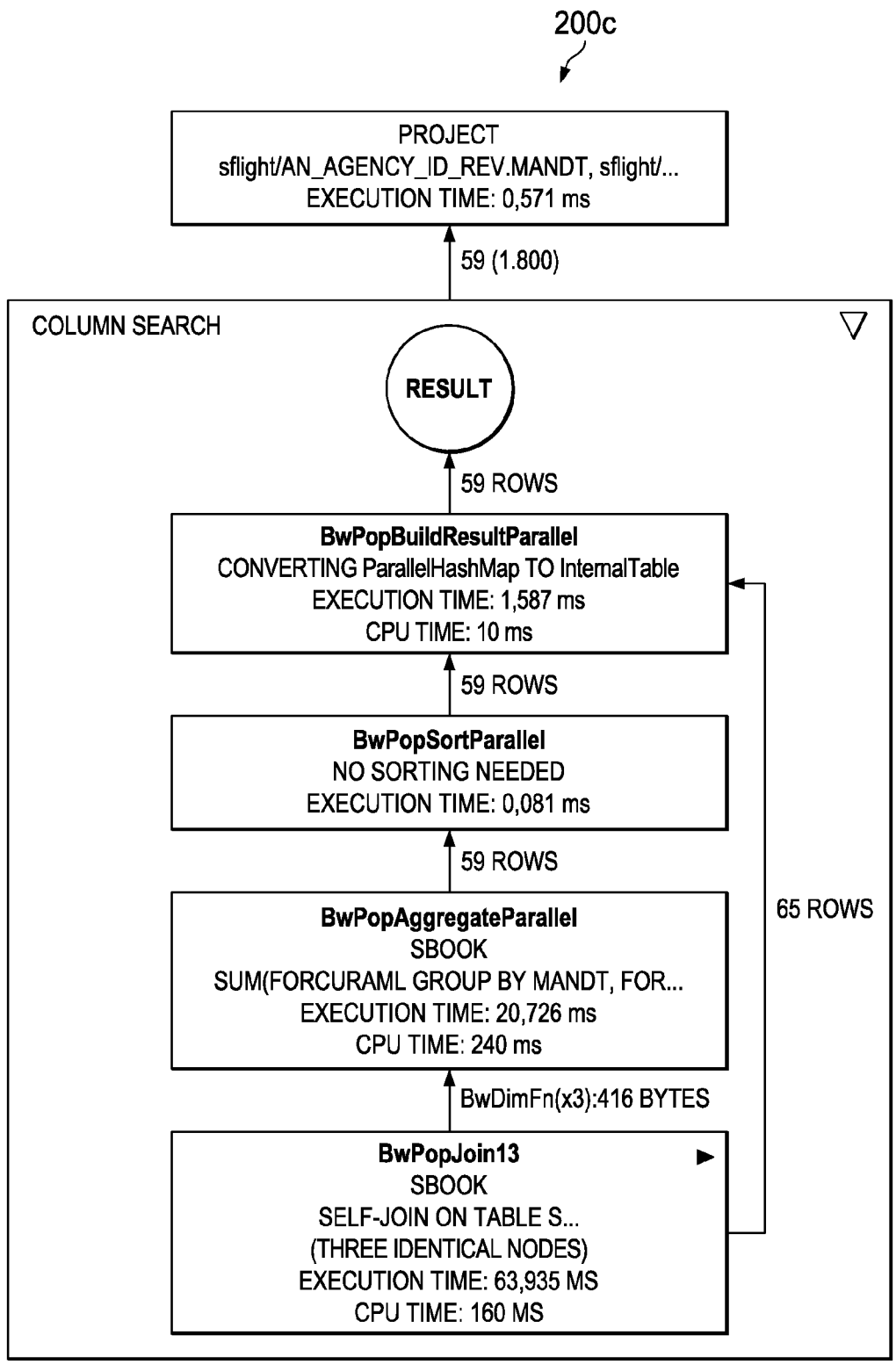
FIG. 2C is a block diagram representing an example user interface displaying an example graphical SQL execution plan.

FIG. 2C is a block diagram 200c representing an example user interface displaying an example graphical SQL execution plan. Reiterating above, in other implementations, this example graphical SQL execution plan could also be represented in a textual and/or other format.

Figure 2D:
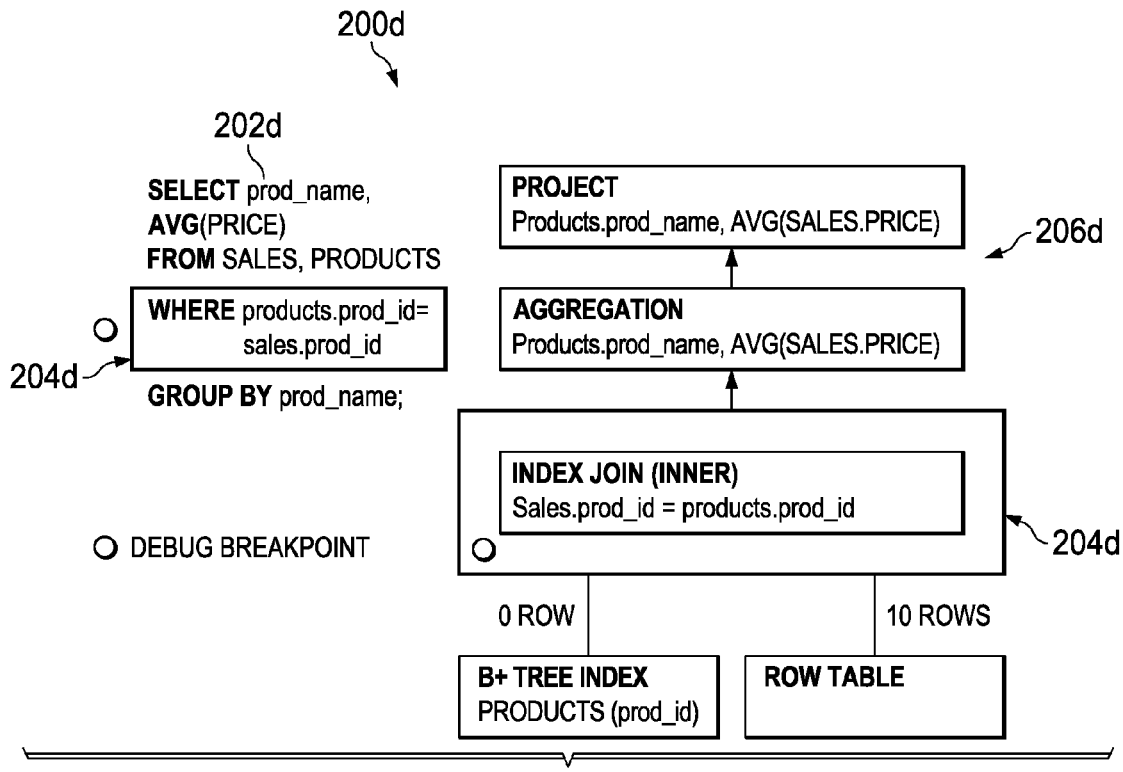
FIG. 2D is a block diagram representing an example for side-by-side user interface displaying both source-code and graphical SQL execution plan according to an implementation.

FIG. 2D is a block diagram 200d representing an example for side-by-side user interface displaying both source-code 202d (with debug breakpoint 204d) and graphical SQL execution plan 206d according to an implementation. In some implementations, the example user interface can allow a user to set a debug breakpoint (e.g., 204d) in each representation (i.e., textual or graphical) with alignment performed automatically to reflect the debug breakpoint in both representations. In some implementations, in case of execution suspending, the relevant position of the execution suspension can be highlighted in both representations. Reiterating above, in other implementations, the example graphical SQL execution plans could also be represented in other formats (e.g., textual, graphical, etc.—possibly with different levels of detail, etc.).

FIG. 1 is a block diagram illustrating an example distributed computing system (EDCS) 100 for debugging structured query language (SQL) statements according to an implementation. The illustrated EDCS 100 includes or is communicably coupled with a server 102 and multiple clients 140 that communicate across a cloud-based computing network 130. In some implementations, one or more components of the EDCS 100 may be configured to operate inside and/or outside of a cloud-based computing environment.

At a high level, the server 102 is an electronic computing device operable to receive, transmit, process, store, or manage data and information associated with the EDCS 100. In general, the server 102 provides functionality appropriate to a server, including database functionality, data processing, and/or receiving/serving content and/or functionality from/ to a client 140. According to some implementations, the server 102 may also include or be communicably coupled with an e-mail server, a web server, a caching server, a streaming data server, a business intelligence (BI) server, and/or other server.

The server 102 is responsible for receiving, among other things, requests and/or content from one or more client applications 146 associated with the client 140 of the EDCS 100. The server 102 can also respond to received requests, for example requests processed by a server application 107, database 106, and/or other components of server 102 (whether or not illustrated).

In addition to requests received from the client 140, requests may also be sent to the server 102 from internal users, external or third-parties, other automated applications, as well as any other appropriate entities, individuals, systems, or computers. In some implementations, various requests can be sent directly to server 102 from a user accessing server 102 directly (e.g., from a server command console or by other appropriate access method).

Each of the components of the server 102 can communicate using a system bus 103. In some implementations, any and/or all the components of the server 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the database 106, the server application 107, the server framework 109, and/or wholly or partially in other components of server 102 (whether or not illustrated).

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. In some implementations, the processor 105 can execute the functionality required for debugging structured query language (SQL) statements, either wholly, or in conjunction with the client 140.

The server 102 also includes a database 106 that holds data for the server 102, client 140, and/or other components of the EDCS 100. Although illustrated as a single database 106 in FIG. 1, two or more databases may be used according to particular needs, desires, or particular implementations of the EDCS 100. While database 106 is illustrated as an integral component of the server 102, in alternative implementations, database 106 can be external to the server 102 and/or the EDCS 100. Database 106 can be configured to store one or more instances of any appropriate data (e.g., queries, user profiles, objects and content, client data, etc.—whether or not illustrated) consistent with this disclosure. In some implementations, the database 106 can be a high-performance analytic appliance with an integrated database and calculation layer that allows the processing of massive quantities of real-time data in main memory to provide immediate results from analyses and transactions (e.g., an in-memory database).

The server application 107 represents one or more algorithmic software engines capable of providing, among other things, any appropriate function consistent with this disclosure for the server 102 (e.g., receiving, processing, transmitting, and/or other functionality with respect to a message sent by a client 140). In some implementations, the server application 107 can be used for functions particular to the server 102. In some implementations, the server application 107 can provide and/or modify content provided by and/or made available to other components of the EDCS 100. In other words, the server application 107 can act in conjunction with one or more other components of the server 102 and/or EDCS 100 in responding to a message (e.g., a request) for content received from the client 140. The server application 107 can also act in conjunction with the client 140 to perform processing.

Figure 3:
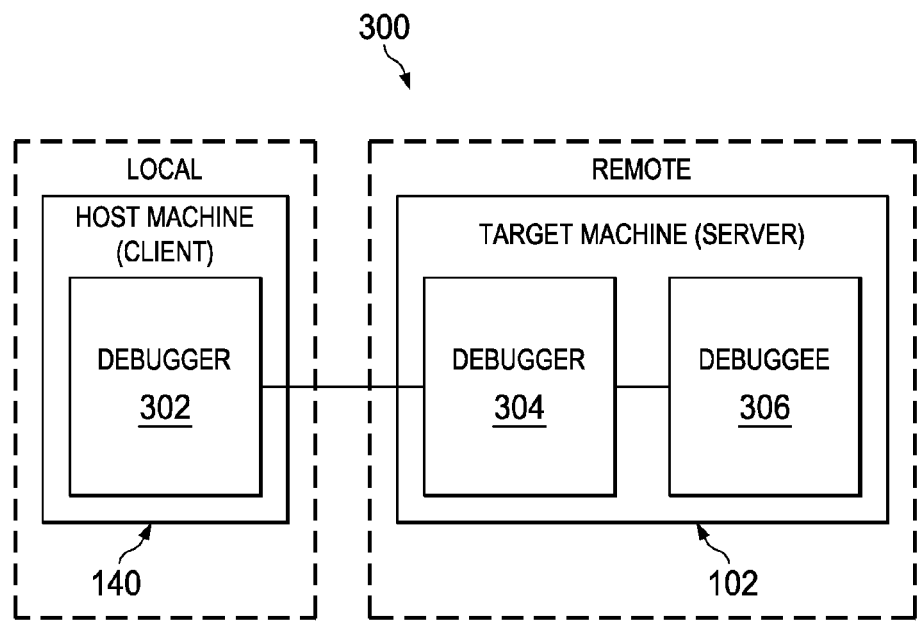
FIG. 3 is a block diagram of an example client/server allowing remote debugging of a SQL statement according to an implementation.
Figure 4:
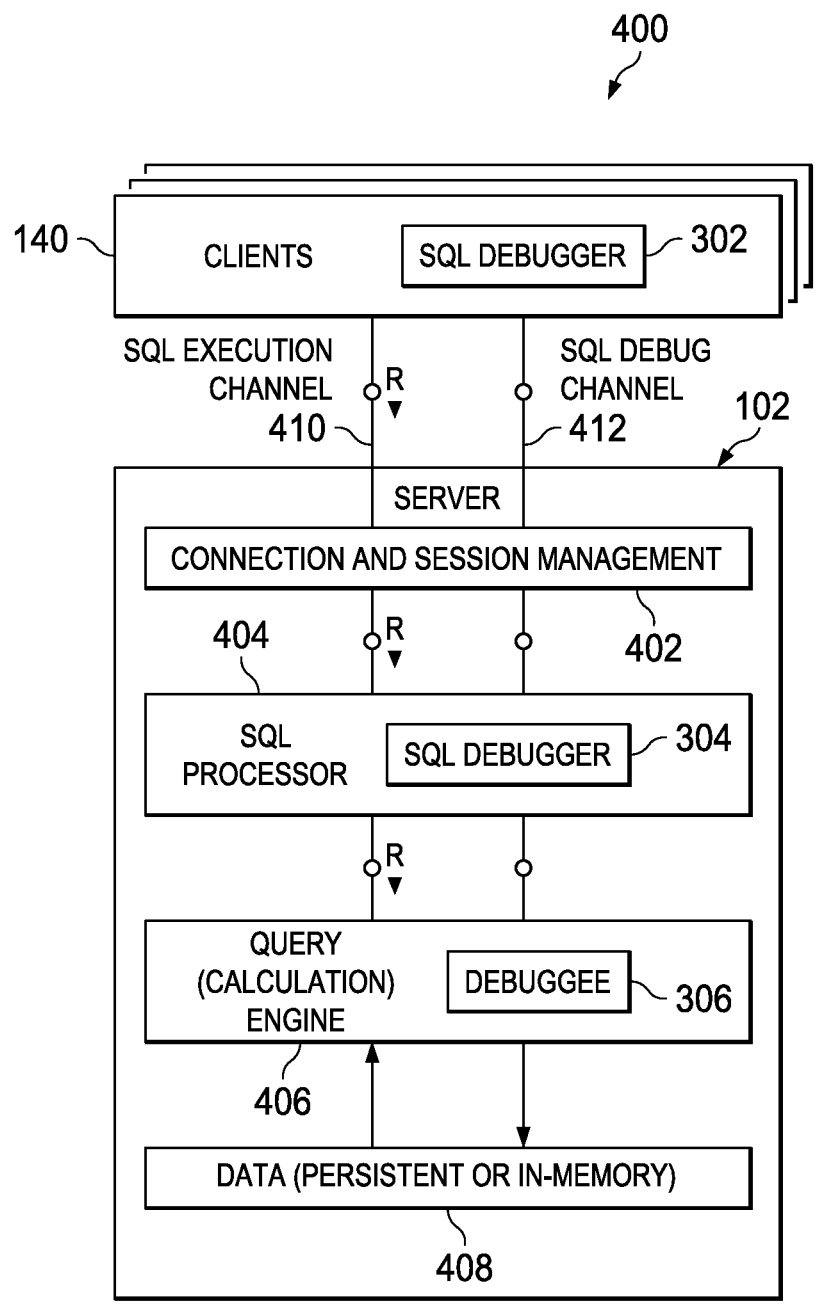
FIG. 4 is a block diagram illustrating additional components of the EDCS of FIG. 1 for debugging SQL statements according to an implementation.
Figure 5:
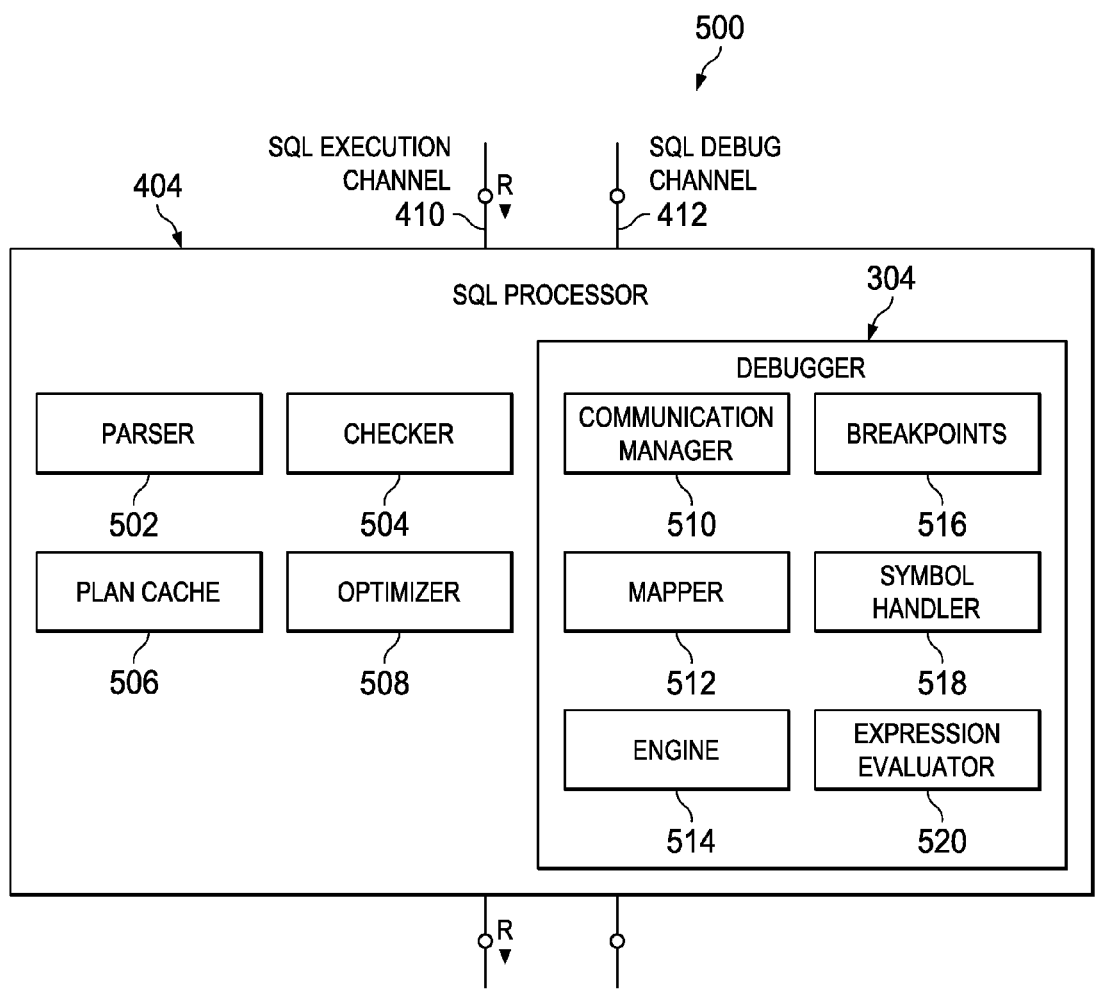
FIG. 5 is a block diagram illustrating a detailed view of components (detailed components of the EDCS of FIG. 4) of a SQL processor according to an implementation.

Although illustrated as a single server application 107, the server application 107 may be implemented as multiple server applications 107 (e.g., see FIGS. 3-5). In addition, although illustrated as integral to the server 102, in alternative implementations, the server application 107 can be external to the server 102 and/or the EDCS 100 (e.g., wholly or partially executing on the client 140, other server 102 (not illustrated), etc.). Once a particular server application 107 is launched, the particular server application 107 can be used, for example by an application or other component of the EDCS 100 to interactively process received messages (e.g., from client 140) or for any other functionality consistent with this disclosure. In some implementations, the server application 107 may be a network-based, web-based, native, remote, and/or other suitable application consistent with this disclosure.

In some implementations, a particular server application 107 may operate in response to and in connection with at least one message received from other server applications 107, other components (e.g., software and/or hardware modules) associated with another server 102, and/or other components of the EDCS 100. In some implementations, the server application 107 can be accessed and executed in a cloud-based computing environment using the network 130. In some implementations, a portion of a particular server application 107 may be a web service associated with the server application 107 that is remotely called, while another portion of the server application 107 may be an interface object or agent bundled for processing by any suitable component of the EDCS 100. Moreover, any or all of a particular server application 107 may be a child or submodule of another software module or application (not illustrated) without departing from the scope of this disclosure. Still further, portions of the particular server application 107 may be executed or accessed by a user working directly at the server 102, as well as remotely at a corresponding client 140. In some implementations, the server 102 or any suitable component of server 102 or the EDCS 100 can execute the server application 107.

The memory 108 typically stores objects and/or data associated with the purposes of the server 102 but may also be used in conjunction with the database 106 to store, transfer, manipulate, etc. objects and/or data. The memory 108 can also consistent with other memories within the EDCS 100 and be used to store data similar to that stored in the other memories of the EDCS 100 for purposes such as backup, caching, and/or other purposes.

The client 140 may be any computing device operable to connect to and/or communicate with at least the server 102. In general, the client 140 comprises an electronic computing device operable to receive, transmit, process, and store any appropriate data associated with the EDCS 100, for example, the server application 107. More particularly, among other things, the client 140 can collect content from the client 140 and upload the collected content to the server 102 for processing by the server application 107. The client typically includes a processor 144, a client application 146, a memory/database 148, and/or an interface 149 interfacing over a system bus 141.

In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100. For example, the client application 146 can generate and transmit a particular message (e.g., a database request or a request for content) to the server 102.

The client application 146 is any type of application (e.g., a browser, a SQL debugger, etc.) that allows the client 140 to navigate to/from, request, view, create, edit, delete, administer, and/or manipulate content associated with the server 102 and/or the client 140. For example, the client application 146 can present graphical user interface (GUI) displays and associated data to a user that is generated/transmitted by the server 102 (e.g., the server application 107 and/or database 106). In some implementations, the client application 146 working as a SQL-related application (e.g., a SQL debugger) working independently or in conjunction with the server 102 (e.g., a SQL-related application executing on server 102). For example, see FIGS. 3-5.

In some implementations, the client application 146 can also be used to perform administrative functions related to the client 140, server application 107, database 106, and/or the server 102 in general. For example, the server application 107 can generate and/or transmit administrative pages to the client application 146 based on a particular user login, request, etc.

Further, although illustrated as a single client application 146, the client application 146 may be implemented as multiple client applications in the client 140. For example, there may be a native client application and a web-based (e.g., HTML) client application depending upon the particular needs of the client 140 and/or the EDCS 100.

The interface 149 is used by the client 140 for communicating with other computing systems in a distributed computing system environment, including within the EDCS 100, using network 130. For example, the client 140 uses the interface to communicate with a server 102 as well as other systems (not illustrated) that can be communicably coupled to the network 130. The interface 149 may be consistent with the above-described interface 104 of the server 102. The processor 144 may be consistent with the above-described processor 105 of the server 102. Specifically, the processor 144 executes instructions and manipulates data to perform the operations of the client 140, including the functionality required to debug structured query language (SQL) statements—either wholly or in conjunction with the server 102.

The memory/database 148 typically stores objects and/or data associated with the purposes of the client 140 but may also be consistent with the above-described database 106 and/or memory 108 of the server 102 or other memories within the EDCS 100 and be used to store data similar to that stored in the other memories of the EDCS 100 for purposes such as backup, caching, and the like. Although illustrated as a combined memory/database, in some implementations, the memory and database can be separated (e.g., as in the server 102). Note that in some implementations, the separated database 106 and memory 108 can also be combined as illustrated in client 140.

Further, the illustrated client 140 includes a GUI 142 that interfaces with at least a portion of the EDCS 100 for any suitable purpose. For example, the GUI 142 (illustrated as associated with client 140*a*) may be used to view and/or transmit data associated with the client 140, the server 102, or any other component of the EDCS 100. In particular, in some implementations, the client application 146 may render GUI interfaces received from the server application 107 and/or data retrieved from any element of the EDCS 100.

There may be any number of clients 140 associated with, or external to, the EDCS 100. For example, while the illustrated EDCS 100 includes three clients 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example implementations illustrated as 140*a*-140*d*) is intended to encompass any computing device such as a desktop computer/server, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142 (illustrated by way of example only with respect to the client 140*a*).

FIG. 3 is a block diagram 300 of an example client/server allowing remote debugging of a SQL statement according to an implementation. In a typical SQL debug scenario a process allows debugging of a program (e.g., a SQL statement) running on a remote system (remote debugging). The host machine (herein: client 140) is the computer that is running the debugger tool (SQL debugger 302).

The target machine (e.g., server 102) is a computer running a remote debugging server (SQL debugger 304) and the SQL statement that needs to be debugged (debuggee 306). The client-side SQL debugger 302 controls the server-side SQL debugger 304. The client-side SQL debugger 302 typically is associated with a user interface that controls the server-side SQL debugger 304 in order to support SQL debugging by a user. The server-side SQL debugger 304 typically waits from commands from the client-side SQL debugger 302. Entering a debug command can be done from client-side SQL debugger 302 or directly on server-side SQL debugger 304 and the result can be the same. However, the client-side SQL debugger 302 provides an easy and simple debug process based on user interactions, and therefore it is the common scenario for entering debug commands.

As an example, to start remote debugging, the client-side SQL debugger 302 connects to a server-side SQL debugger 304 over a network. The client-side SQL debugger 302 can then control the debuggee 306 (e.g., using the server-side SQL debugger 304) on the server 102 and can retrieve information about its state. The client-side SQL debugger 302 may also trigger the debuggee 306 directly, but also in this case, the client-side SQL debugger 302 would not have direct control of the debuggee 306 (i.e. only using the server-side SQL debugger 304). The server-side SQL debugger 304 is an integral part of a database server (e.g., server 102), while, in some implementations, the client-side SQL debugger 302 can be a vendor's tool as well as any external tool which is based on the server-side SQL debugger's 304 protocol.

Accordingly, the server-side SQL debugger 304 has control (during a debug session) on the query engine (see FIG. 4), using related internal APIs, and has the capability to impact the execution (e.g., set breakpoints, break, resume, suspend SQL execution). The APIs include, among other things, request/response mechanisms and events mechanisms, in order to support an efficient debugging scenario.

The server-side SQL debugger 304 provides extensive data related to a break point (current execution context), such as execution time, number of rows, data volume size, a certain expression, on plan operator level, and/or additional data to bring a user better understanding of how a SQL statement works (implicit logic). In addition, performance related data is also provided, such as I/O cost, CPU cost, and maximum memory used. Accordingly, a user has better ways to make SQL statements (e.g., debuggee 306) execute as expected and to understand potential improvements and optimizations to the debuggee 306.

The client-side SQL debugger 302 can also include a user interface (e.g., GUI 142) that allows visualization of the debuggee 306. The user interface can be provided in different flavors, ranging from a simple command-line to extensive GUIs. The user interface can also include an original SQL statement with debugged part focus, according to user preference. For example below, the "WHERE" statement is indicated (here with ">>>" and "<<<") as being debugged. In other implementations, color, graphical highlighting, etc. can be used to indicate a particular SQL statement(s).

```
       SELECT ...
       FROM
       (
           SELECT ...
               CASE
                   WHEN ... THEN ...
                   WHEN ... THEN ...
                   ELSE ...
               CASE
                   WHEN ... THEN ...
                   WHEN ... THEN ...
                   ELSE ...
               FROM ...
               WHERE ...
               (
                   SELECT ...
                   FROM ...
  >>>              WHERE ...<<<
               )
               LEFT JOIN ... ON ... AND ...
       )
       GROUP BY ...
       HAVING ...
       ORDER BY ...
```

In some implementations, the user interface can also include a SQL execution plan (e.g., see FIGS. 2A and 2B) for reference, in various different visualizations according to user and/or administrator preferences.

FIG. 4 is a block diagram 400 illustrating additional components of the EDCS of FIG. 1 for debugging SQL statements according to an implementation. As can be seen, the server 102 is a Database Management System (DBMS), comprised of several components, including a connection and session management component 402 and specific related SQL component, such as an SQL processor 404. The connection and session management component 402 creates and manages sessions and connections for interactive information interchange between the clients 140 and the server 102. The SQL processor 404 is responsible for SQL statement processing, data manipulation statements, contains the server-side SQL debugger 304 and translates a SQL statement to an execution plan, consisting of plan operators, which is executed by the query engine 406.

The query engine 406 is the server-side SQL query executor and executes the SQL statement parts (plan operators) and has the capability to expose intermediate results (before-after each plan operators) per request. The query engine 406 also materializes and sends related data to the client 140 following a concrete request. The query engine 406 also interacts with data 408 (e.g., in persistent or in-memory memory), during query (command-by-command) execution, for data manipulation, locking and managing transactions.

Clients 140 are responsible for a user interface (user interaction) and the related interactions with the Server 102. A typical client 140 is an Integrated Development Environment (IDE) which includes a set of programming tools for application development and execution, including the client-side SQL debugger 302. The client-side SQL debugger 302 can visualize an execution plan (e.g., textual or graphical) and/or focus on a debugged SQL statement (e.g., the debuggee 306). The client 140 (and client-side SQL debugger—also the server/server-side SQL debugger 304) can use any independent technology including existing debugger frameworks which support IDE development requirements (for example for client-side debugger: ECLIPSE or MICROSOFT VISUAL STUDIO).

Client-Server interaction is handled by a communication part, which is related to the server 102's connection and a session management component 402, and also includes an applicative (debugger) protocol, related to the debugger communication manager (part of the server-side SQL debugger 304—see FIG. 5). The connection and session management component 402 manages client sessions and connections, and also authorization (based on system requirements), so that for each session a set of parameters is maintained, for example related to commits and transactions. Once a session is established, clients 140 can send messages to the server 102, typically using direct SQL statements, but could send messages with any other protocol, standard or propriety. The connection and session management component 402 does not analyze and process the applicative (debugger) protocol nor the debuggee 306 itself, but enables the communication channel and passes the data to the SQL processor 404.

In some implementations, there are two communication channels for a SQL debug scenario:

SQL Execution Channel 410
  A standard channel for productive SQL execution (i.e., not specifically for debugging purposes; also, without debugging interference). During a debug process, the SQL execution channel 410 is used for the debuggee 306. In typical implementations, the SQL execution channel 410 has single direction communication, a request-response pattern, according to standard SQL behavior.

SQL Debug Channel 412
  A channel for specific debug interaction, which supports capabilities such as breakpoint settings, suspend, run/resume, step-into, step-next/over, and step-out/return. A user can step into a SQL statement part or set breakpoints based on execution plan and break (pause) accordingly. In typical implementations, the SQL debug channel 412 supports bi-directional communication, commands (request-response pattern—a.k.a., request-driven, request-reply, request-based, pull mode, etc.) which are sent from client-side SQL debugger 302 to server-side SQL debugger 304, and notifications (event pattern—a.k.a., event-driven, notification, publish-subscribe, push mode, etc.) which are sent from server-side SQL debugger 304 to client-side SQL debugger 302. For example, setting a breakpoint is done by a command (triggered by client-side SQL debugger 302), while a breakpoint hit notification is by event (triggerd by server-side SQL debugger 304). An example for such protocol, consisting of commands and notifications, is CROSSFIRE.

The server-side SQL debugger 304 uses the debug protocol to communicate with the client-side SQL debugger 302, and communicates (using related internal APIs) with the query engine 406 to take over control of the SQL execution during a debug session. In addition, in some implementations, the server-side SQL debugger 304 holds and manages specific debug data. In other implementations, the client-side SQL debugger 302 and/or other components of the EDCS 100 can also hold and manage debug data.

FIG. 5 is a block diagram 500 illustrating a detailed view of components (detailed components of the EDCS of FIG. 4) of a SQL processor according to an implementation. In typical implementations, the SQL processor includes a parser 502, checker 504, plan cache 506, optimizer 508, and server side SQL debugger 304. The parser 502 (a.k.a., SQL Command Parser) performs syntax checks on a current SQL statement 306 and raises a syntax error if syntax is not recognized. The parser 502 also translates SQL statement 306 into an internal query tree (a tree structure that corresponds to a query). The checker 504, based on the query tree, is used to access metadata and to verify types, which are needed during the parser 502 activity (both syntactic and semantic correctness). The plan cache 506 caches an execution plan (both productive and debug execution plans) in order to avoid repeated optimizing efforts for the same query. The plan cache 506 maps a query string to the execution plan and other metadata derived during optimization. The optimizer 508 (a.k.a., Query Optimizer) calculates the most efficient way (or according to the required optimization level in the case of debug mode) to implement the request represented by the submitted query based on the query tree produced by the parser 502, so it is being prepared for execution. In some implementations, only DML statements (e.g., select, insert, update, delete) are passed through as they can be processed in many different ways. The query optimizer 508 can compile the commands, optimize when possible, check for security, and create a final execution plan. The optimizer 508 behavior may change in a debug mode, according to a requested optimization level.

The server-side SQL debugger 304 includes a communication manager 510, mapper 512, engine 514, breakpoints 516, symbol handler 518, and expression evaluator 520. The communication manager 510 communicates with various components of the EDCS 100 (for example with query engine 406 and the client-side SQL debugger 302. The communication manager 510 handles the debugger protocol for client communication and the internal communication (internal APIs) with the query engine 406 (both stateful connections). The mapper 512 maps between an original SQL statement (known by the user) and a corresponding execution plan (e.g., a plan operator's resolution). The mapper 512 provides the related original SQL statement part to the current executed step. The engine 514 controls the component's orchestration. For example, receive a breakpoint hit notification from the query engine 406 and dispatch it to the communication manager 510 for sending to the client-side SQL debugger 302. The engine 514 also monitors the execution plan that is being debugged, communicating the state of the running execution, and interacts with the symbol handler 518 and the expression evaluator 520 to provide real-time state analysis of an execution's memory and variables. Breakpoints 516 stores and operates a session's breakpoints which allow execution suspension. The breakpoints 516 verify the breakpoints (whether they are valid or not, for example to avoid setting breakpoints in unbreakable places) and support conditional breakpoints based on a given logic. In contradiction to conventional program languages, debugging the logical breakpoint locations are not directly linked to the SQL statement but rather on a related execution plan and plan operators. The symbol handler (a.k.a., Symbol Provider) maps the SQL execution plan debugging symbols to a SQL execution plan running instance, so that meaningful information can be provided (e.g., expression evaluation). The expression evaluator 520 supports dynamic variable and expression evaluation when a program has been stopped at a particular point. This functionality is accomplished using an execution context and intermediate results.

Figure 6:
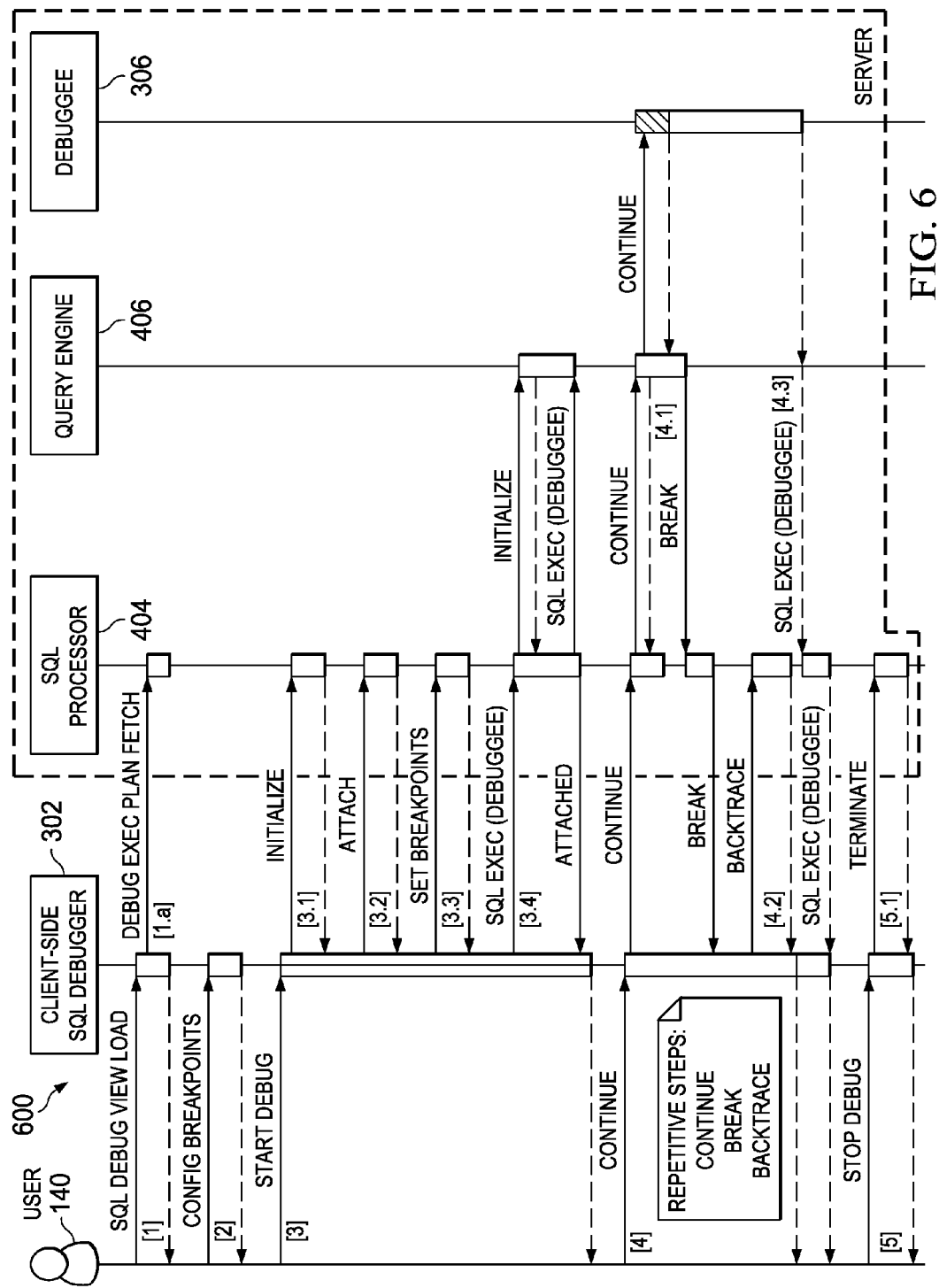
FIG. 6 is a sequence diagram of a method for debugging structured query language (SQL) statements according to an implementation.

FIG. 6 is a sequence diagram of a method 600 for debugging structured query language (SQL) statements according to an implementation. For clarity of presentation, the description that follows generally describes method 600 in the context of FIGS. 1, 2A-2B, and 3-5. However, it will be understood that method 600 may be performed, for example, by any other suitable system, environment, software, and hardware, or a combination of systems, environments, software, and hardware as appropriate. In some implementations, various steps of method 600 can be run in parallel, in combination, in loops, and/or in any order. Note that sequence diagram 600 refers to a straightforward debug scenario for simplicity, and does not represent all possible scenarios. For example, there is no reference to multi-context debugging (e.g., parallel SQL debugging in a single debug session), or to a debuggee trigger from different client, or to expression inspection, or to error handling which are also possible scenarios. Those of ordinary skill should understand modifications to sequence diagram 600 necessary to reflect these other possible scenarios.

The debugger execution and the debuggee execution are decoupled processes. In some implementations, the execution of the debuggee can be initiated by any process (related to the debugger process): even from different client, different user, or different machine.

At [1], a user loads the SQL debug view for a selected SQL statement, based on a debug execution plan, in order to support breakpoints settings by the user. In some implementations, the debug execution plan considers different execution optimization levels and includes a mapping for a structured query language (SQL) statement From [1], method 600 proceeds to [1.a].

At [1.a], the debug execution plan is fetched, including a mapping to the SQL statement, in order to support breakpoint settings. The debug execution plan is typically cached (e.g., server-side) for repetitive debug scenarios, and for potential optimization the debug execution plan can be compiled during design time (e.g., relevant for persisted SQL statements, as within stored procedures). From [1.a], method 600 proceeds to [2].

At [2], a user maintains breakpoints (e.g., add/remove) based on the received debug execution plan and/or mapping to the selected SQL statement. A breakpoint identifies a specific plan operator (more accurate before or after a plan operator) and, in some implementations, is stored (e.g., a persistency) on the client-side. The user can skip this step if breakpoints are already configured. From [2], method 600 proceeds to [3].

At [3], the user starts a debug process for the already selected SQL statement. From [3], method 600 proceeds to [3.1].

At [3.1], the debug session (may contain multi-contexts—i.e., multiple debuggees) is initialized. For example, a client sends session-based configured data, such as SQL optimizing level (e.g., full, semi, none). The SQL processor prepares for a debug session. From [3.1], method 600 proceeds to [3.2].

At [3.2], criteria (filter) are attached according to user name, application name, connection id, debug token, or any other property which is provided in the SQL execution channel (debuggee). The client sends the criteria and the SQL processor begins to verify these criteria on, for example, a JDBC connection (although other connection types are also possible). The client can also send new attach criteria as long as the debug session is active (in which case it overrides previous attach criteria). In other implementations, new attach criteria does not automatically override previous attach criteria. From [3.2], method 600 proceeds to [3.3].

At [3.3], breakpoints are set based on already configured breakpoints. The breakpoint configuration is done by the user and could also be loaded from persistency (done once and stored also for later debugging). It could be that there is no configured breakpoints as user wants to use step-in operation (i.e. suspend before the first plan operator). In some implementations, any process can also be used to set breakpoints. From [3.3], method 600 proceeds to [3.4].

At [3.4], the SQL statement (debuggee) is triggered. Note that the debuggee could be triggered from a different client process, or even from a different machine. The important thing is the correlation between the attach criteria and the debuggee connection (e.g., JDBC) properties in order to allow debugging. The SQL statement response is provided only at the end of the SQL execution (same as in a no-debug scenario). When the SQL processor matches the required criteria on the connection, it initializes the query engine with the specific debug mode and the debug execution plan (according to the requested SQL optimizing level). At this point in time, the SQL processor sends an attached notification to the client to notify that the debuggee process is attached to the debugger and that the debuggee is ready for client-side SQL debugger execution control. From [3.4], method 600 proceeds to [4].

At [4], the user continues the SQL execution. The continuation of the SQL execution could be with a resolution of step-into, step-next/over, step-out/return, run/resume, etc. The SQL processor dispatches the request to the query engine, which executes the debuggee, and notifies the client that the request was executed. From [4], method 600 proceeds to [4.1].

At [4.1], when the query engine reaches a relevant next step (according to the requested execution plan step), it provides a break notification (with details of the break place). From [4.1], method 600 proceeds to [4.2].

At [4.2], the client requests state details, such as current state (plan operator, related original SQL part, and/or intermediate results), and previous steps (for example call stack—including information about the current and previous debuggee plan operators). For the intermediate results, it receives handles only. Further specific user requests are required in order to access and fetch the materialized data (produced by the query engine for debug information exposure only). From [4.2], method 600 proceeds to [4.3].

At [4.3], when the query engine reaches the end of the SQL execution, it sends an SQL execution response (execution result) to the client (user). From [4.3], method 600 proceeds to [5].

At [5], the user stops the debug process. In typical implementations, this is performed (manually or automatic) after SQL statement (one or many) executions are finished. It is also possible to stop the debug process within a SQL statement execution. From [5], method 600 proceeds to [5.1].

At [5.1], the client terminates the debugging session. The SQL processor will no longer verify the connection (e.g., JDBC) properties (as requested in the session) and will clean the debugger session's related data. Note that [4], [4.1], and [4.2] may execute multiple times until the SQL statement execution end [4.3].

Note that the SQL execution, in contradiction to conventional programming language execution, has a couple aspects which make the debugging process more complex:
  Optimization—as described above, the purpose of debugging is to allow the user to detect and correct the SQL statement logic and it is not meant for performance optimization (at least not for deep tuning). Accordingly, the execution plan during SQL debugging (execution) could be without optimization or with a limited optimization (productive mode vs. debug modes).
  Data Volume Size—during debugging, a user is able to view intermediate results and evaluate expressions based on the intermediate results (e.g., intermediate tables and records), the context, and the tables in a store. The expressions can be simple expressions or a free query. The intermediate results are not sent automatically from the server to the client (e.g, after a breakpoint hit), due to potential high data volume size, but just per explicit request; more than that, the initial response will typically not include any data but metadata, for example data size and a number of result records. The client should send an explicit request in order to access and fetch the actual data. This data request-response pattern supports size limitation and paging mechanism.

Figure 7:
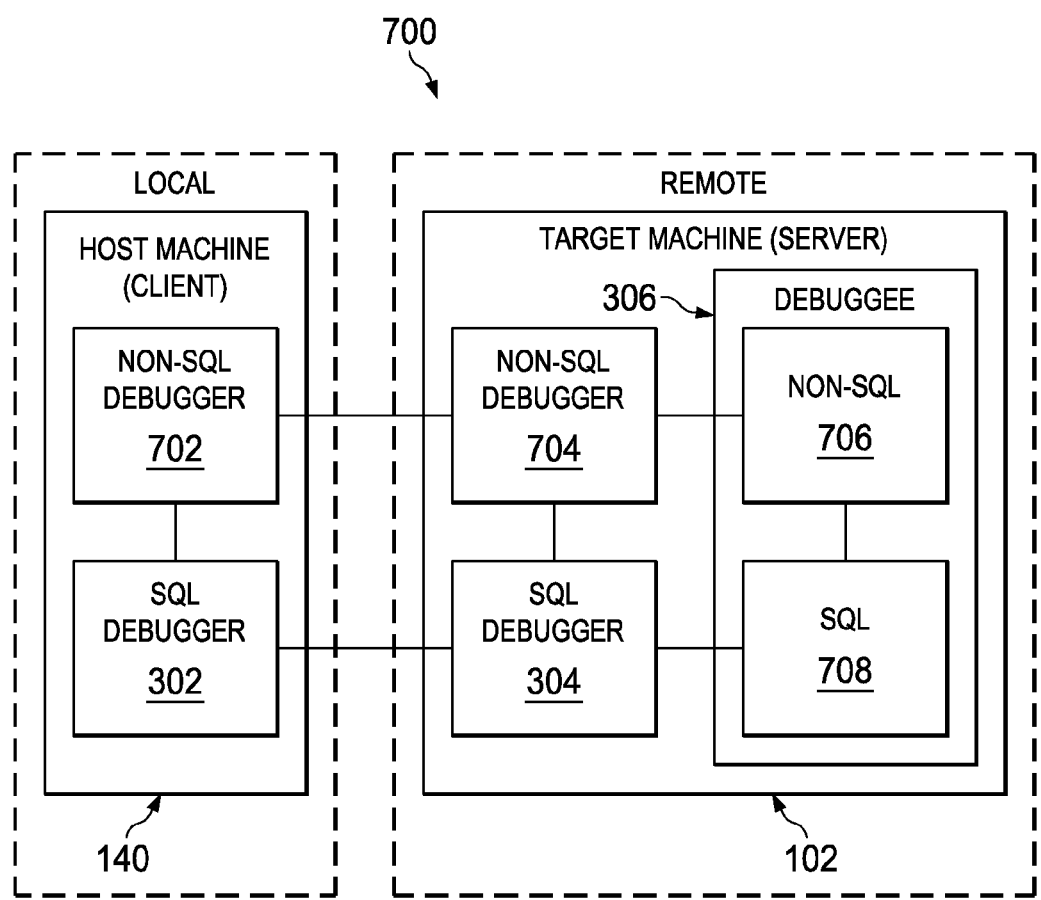
FIG. 7 is a block diagram of an integrated SQL debugger according to an implementation.

FIG. 7 is a block diagram 700 of an integrated SQL debugger according to an implementation. In some implementations, the SQL debugger can be a standalone SQL debugger for debugging independent SQL statements or integrated into a debugger for other programming languages. A typical use case is one with a stored procedure 706 (for example written in SQLSCRIPT language or in any high-level programming language) which is being compiled into SQL blocks. The user can then step into the embedded SQL similar to how the user can step into the original programming language nested call stack.

The integrated (unified) debugger (both SQL and Non-SQL) is achieved by exposing client-side APIs which allow other debuggers 702 to trigger (launch) the SQL debugger 302. In this way, related SQL execution can be debugged even if triggered from another programming language. The important thing is that the user can debug stored procedures (or other programming languages) 706 and seamlessly step into the embedded SQL 708.

For each debugging session, a set of parameters is maintained (i.e., a stateful aspect). An example of an important parameter is the debugger token—a unique identifier for a debug session (current). The communication and session management 402 mechanism supports (optional) client token (created or identified by the non-SQL debugger) in order to allow client debugger integration (a.k.a., a unified debugger), for example the client/server-side non-SQL debugger 702/704 and client/server-side SQL debugger 302/304. In some implementations, the non-SQL debugger 702/704 is the master debugger which initiates the process and controls the SQL debugger 302/304, which is the slave debugger. In a typical scenario (although various other scenarios/implementations are possible), the client-side master debugger 702 creates (generates) a token and passes it to the client-side slave debugger 302. Both client-side debuggers (master and slave) 702/302 notify the server-side debuggers 704/304 about the token, which then being filtered accordingly on communication level by the communication and session management 402. In this way the process guaranty that the relevant SQL will be debugged by the user following the non-SQL execution. Note that these debugger integrations 702/302/704/304 are done in the background and, based on GUI unification, a user is not aware that two isolated processes are integrated in the background. That is, from user perspective, there is a single debugger which allows the debug of both non-SQL and SQL.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
receiving a request to fetch a debug execution plan, the debug execution plan comprising a plurality of structured query language (SQL) execution optimization levels, a mapping for a SQL statement, and a plurality of plan operators;
receiving a request to initialize a debugging process of the SQL statement based on the debug execution plan;
verifying filter criteria comprising received filter criteria and attached filter criteria the filter criteria being customized based on properties provided using a SQL debug channel distinct from a unidirectional communicative SQL execution channel, the SQL debug channel supporting bi-directional communication with a client-side SQL debugger and used by a server-side SQL debugger to issue commands to a SQL query engine to assume control over execution of the SQL statement;

setting breakpoints associated with the SQL statement based on the debug execution plan, before or after the execution of each of the plurality of plan operators;

triggering the SQL statement;

transmitting a notification that a SQL process associated with the SQL statement is attached to a debugger associated with the debugging process and ready for external execution control;

providing information associated with a process state and an intermediate result upon reaching a particular breakpoint associated with a portion of the SQL process executing the triggered SQL statement, the process state comprising one of the plurality of plan operators associated with the portion of the SQL process and a related original portion of the SQL process;

receiving, during a suspension of execution of the SQL process, a change to the process state to influence the SQL process indicated by the mapping that provides a match between the change to the process and the portion of the SQL process; and providing a SQL final execution response after reaching an end of the debug execution plan for the SQL statement.

2. The method of claim 1, comprising loading a SQL debug view of the selected SQL statement based on the debug execution plan.

3. The method of claim 1, wherein the debugging process is associated with a plurality of contexts.

4. The method of claim 3, comprising:

viewing intermediate results; and evaluating expressions associated with the SQL process based on the intermediate results, a context of the plurality of contexts, data tables in a data store, and a context change which influences the rest of debugged process execution.

5. The method of claim 1, wherein newly attached filter criteria overrides previous filter criteria as long as the debugging process is active.

6. The method of claim 1, comprising initializing a query engine to execute the SQL statement using the debug execution plan and filter criteria.

7. The method of claim 1, comprising providing a break notification when a particular breakpoint associated with the SQL statement is reached.

8. A non-transitory, computer-readable medium storing computer-readable instructions executable by a computer and configured to:

receive a request to fetch a debug execution plan, the debug execution plan comprising a plurality of structured query language (SQL) execution optimization levels, a mapping for a SQL statement, and a plurality of plan operators;

receive a request to initialize a debugging process of the SQL statement based on the debug execution plan;

verify filter criteria comprising received filter criteria and attached filter criteria, the filter criteria being customized based on properties provided using a SQL debug channel distinct from a unidirectional communicative SQL execution channel, the SQL debug channel supporting bi-directional communication with a client-side SQL debugger and used by a server-side SQL debugger to issue commands to a SQL query engine to assume control over execution of the SQL statement;

set breakpoints associated with the SQL statement based on the debug execution plan, before or after the execution of each of the plurality of plan operators;

trigger the SQL statement;

transmit a notification that a SQL process associated with the SQL statement is attached to a debugger associated with the debugging process and ready for external execution control;

provide information associated with a process state and an intermediate result upon reaching a particular breakpoint associated with a portion of the SQL process executing the triggered SQL statement, the process state comprising one of the plurality of plan operators associated with the portion of the SQL process and a related original portion of the SQL process;

receiving, during a suspension of execution of the SQL process, a change to the process state to influence the SQL process indicated by the mapping that provides a match between the change to the process and the portion of the SQL process; and provide a SQL final execution response after reaching an end of the debug execution plan for the SQL statement.

9. The computer-readable medium of claim 8, comprising instructions to load a SQL debug view of the selected SQL statement based on the debug execution plan.

10. The computer-readable medium of claim 8, wherein the debugging process is associated with a plurality of contexts.

11. The computer-readable medium of claim 10, comprising instructions to:

view intermediate results; and evaluate expressions associated with the SQL process based on the intermediate results, a context of the plurality of contexts, data tables in a data store, and a context change which influences the rest of debugged process execution.

12. The computer-readable medium of claim 8, wherein newly attached filter criteria overrides previous filter criteria as long as the debugging process is active.

13. The computer-readable medium of claim 8, comprising instructions to initialize a query engine to execute the SQL statement using the debug execution plan and filter criteria.

14. The computer-readable medium of claim 8, comprising instructions to provide a break notification when a particular breakpoint associated with the SQL statement is reached.

15. A computer system, comprising:

a memory;

at least one hardware processor interoperably coupled with the memory and configured to:

receive a request to fetch a debug execution plan, the debug execution plan comprising a plurality of structured query language (SQL) execution optimization levels, a mapping for a SQL statement, and a plurality of plan operators;

receive a request to initialize a debugging process of the SQL statement based on the debug execution plan;

verify filter criteria comprising received filter criteria and attached filter criteria, the filter criteria being customized based on properties provided using a SQL debug channel distinct from a unidirectional communicative SQL execution channel, the SQL debug channel supporting bi-directional communication with a client-side SQL debugger and used by a server-side SQL debugger to issue commands to a SQL query engine to assume control over execution of the SQL statement;

set breakpoints associated with the SQL statement based on the debug execution plan, before or after the execution of each of the plurality of plan operators;

trigger the SQL statement;

transmit a notification that a SQL process associated with the SQL statement is attached to a debugger associated with the debugging process and ready for external execution control;

provide information associated with a process state and an intermediate result upon reaching a particular breakpoint associated with a portion of the SQL process executing the triggered SQL statement, the process state comprising one of the plurality of plan operators associated with the portion of the SQL process and a related original portion of the SQL process;

receiving, during a suspension of execution of the SQL process, a change to the process state to influence the SQL process indicated by the mapping that provides a match between the change to the process and the portion of the SQL process; and provide a SQL final execution response after reaching an end of the debug execution plan for the SQL statement.

16. The computer system of claim 15, configured to load a SQL debug view of the selected SQL statement based on the debug execution plan.

17. The computer system of claim 15, wherein the debugging process is associated with a plurality of contexts.

18. The computer system of claim 17, configured to:
view intermediate results; and
evaluate expressions associated with the SQL process based on the intermediate results, a context of the plurality of contexts, data tables in a data store, and a context change which influences the rest of debugged process execution.

19. The computer system of claim 15, wherein newly attached filter criteria overrides previous filter criteria as long as the debugging process is active.

20. The computer system of claim 15, configured to:
initialize a query engine to execute the SQL statement using the debug execution plan and filter criteria; and
provide a break notification when a particular breakpoint associated with the SQL statement is reached.

* * * * *